United States Patent
Kondo et al.

(10) Patent No.: US 6,904,172 B2
(45) Date of Patent: Jun. 7, 2005

(54) CODING DEVICE AND METHOD, AND DECODING DEVICE AND METHOD

(75) Inventors: Tetsujiro Kondo, Tokyo (JP); Takashi Horishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/903,065

(22) Filed: Jul. 30, 2004

(65) Prior Publication Data

US 2005/0002583 A1 Jan. 6, 2005

Related U.S. Application Data

(62) Division of application No. 09/574,616, filed on May 18, 2000, which is a continuation of application No. PCT/JP99/05166, filed on Sep. 21, 1999.

(30) Foreign Application Priority Data

Sep. 21, 1998 (JP) .......................................... P10-266984

(51) Int. Cl.$^7$ ............................. G06K 9/36; G06K 9/46
(52) U.S. Cl. ...................................... 382/233; 382/190
(58) Field of Search ................................ 382/162, 190, 382/201, 204, 232, 233, 239, 243, 300; 375/240.02, 240.08, 240.12, 240.25; 348/394.1, 397.1; 358/261.2, 430, 523

(56) References Cited

U.S. PATENT DOCUMENTS

| | | | | |
|---|---|---|---|---|
| 4,716,471 A | * | 12/1987 | Yokomizo | .................... 358/296 |
| 4,788,598 A | * | 11/1988 | Ochi et al. | .................. 358/3.01 |
| 5,225,904 A | * | 7/1993 | Golin et al. | ............ 375/240.12 |
| 5,386,508 A | | 1/1995 | Itonori et al. | |
| 5,524,067 A | * | 6/1996 | Miyake et al. | ............... 382/234 |
| 5,552,832 A | * | 9/1996 | Astle | ...................... 375/240.24 |
| 5,570,203 A | * | 10/1996 | Suzuki et al. | ................ 382/250 |
| 5,978,514 A | * | 11/1999 | Yamaguchi et al. | ........ 382/243 |
| 5,982,938 A | * | 11/1999 | Dube | .......................... 382/240 |
| 6,035,070 A | * | 3/2000 | Moon et al. | ................. 382/243 |
| 6,148,030 A | * | 11/2000 | Katata et al. | ............. 375/240.1 |
| 6,222,467 B1 | * | 4/2001 | Moon | .......................... 341/82 |
| 6,463,179 B1 | * | 10/2002 | Kondo et al. | ................ 382/239 |

FOREIGN PATENT DOCUMENTS

| | | | | |
|---|---|---|---|---|
| GB | 2 333 655 | 7/1999 | ............ | H04N/1/41 |
| JP | 5-199418 | 8/1993 | ............ | H04N/1/41 |
| JP | 6-165163 | 6/1994 | .......... | H04N/7/137 |

* cited by examiner

*Primary Examiner*—Andrew W. Johns
*Assistant Examiner*—Amir Alavi
(74) *Attorney, Agent, or Firm*—Frommer Lawrence & Haug LLP; William S. Frommer

(57) ABSTRACT

Conventionally, to code a digitized image signal, a corresponding quantity of information is allocated to an edge part for carrying out coding, and therefore reduction in the quantity of information is limited, deteriorating the coding efficiency.

Thus, an evaluation section of an encoder evaluates the characteristics (strength of correlation between pixels) of an image using a predetermined evaluation function, and decides a transmission pixel in accordance with the characteristics, consequently deciding a random scan order. A differential coding section differentially codes the image on the basis of the scan order decided by the evaluation section. A multiplexing section multiplexes the differential coding output from the differential coding section.

12 Claims, 12 Drawing Sheets

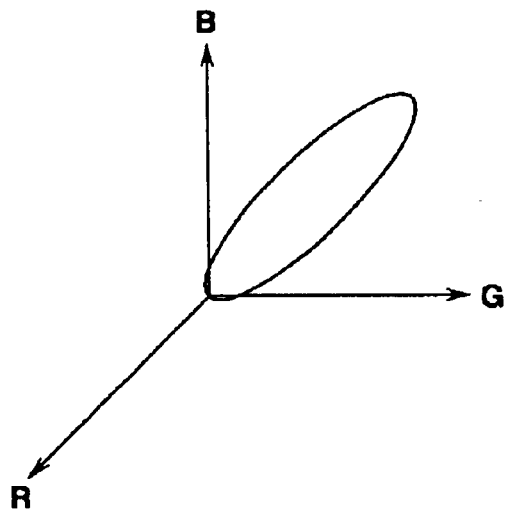
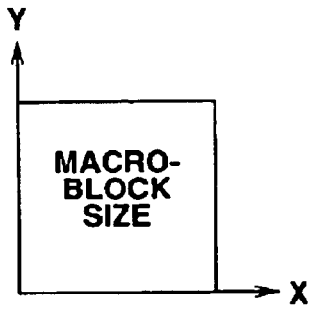
FIG.2A  FIG.2B
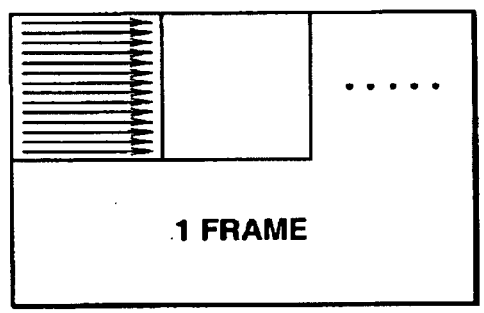
FIG.3A
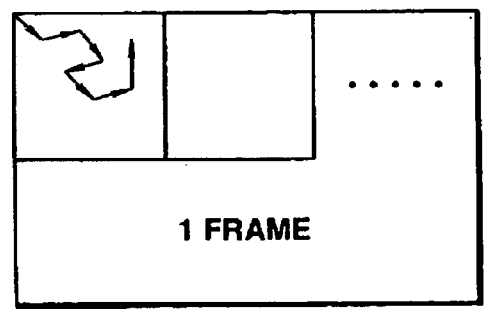
FIG.3B

FIG.12
FIG.13A  PATTERN 1 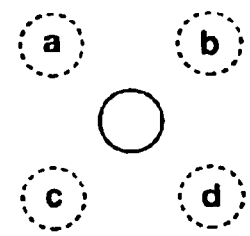
FIG.13B  PATTERN 2 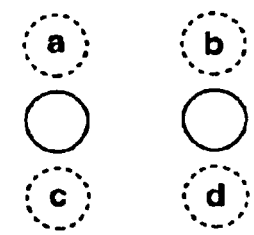
FIG.13C  PATTERN 3 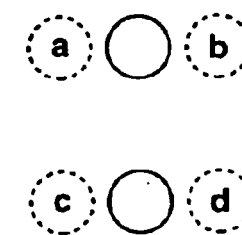
FIG.13D  PATTERN 4 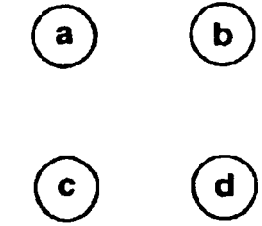

CODING DEVICE AND METHOD, AND DECODING DEVICE AND METHOD

CROSS-REFERENCE TO RELATED APPLICATION

This application is a divisional application of U.S. patent application Ser. No. 09/574,616, filed May 18, 2000, which is a continuation of International Application PCT/JP99/05166 having an international filing date of 21 Sep. 1999.

TECHNICAL FIELD

This invention relates to a coding device and method for coding images, and a decoding device and method for decoding coded data.

BACKGROUND ART

Conventionally, when coding digitized television signals, peripheral information of pixels to be transmitted is used for coding for the following reason. That is, an image generally has strong auto-correlation in a neighboring area, and it is more efficient to use data of the neighboring area in case of compression.

Microscopically, however, a strong correlation is found in a flat part where no signal change occurs while little correlation can be found in an edge part of an image where the signal abruptly changes.

In such case, conventionally, the strength of correlation is fully utilized for coding in a part where a strong correlation is found, and in an edge part, a corresponding quantity of information is allocated for carrying out coding, or coding is carried out within such a range that a visual masking effect can be obtained.

Meanwhile, in the conventional coding, a corresponding quantity of information is allocated for carrying out coding in an edge part of an image. Therefore, the reduction in the quantity of information is limited, thus deteriorating the coding efficiency.

DISCLOSURE OF THE INVENTION

In view of the foregoing status of the art, it is an object of the present invention to provide a coding device and method which enables reduction in the quantity of information and improvement in the coding efficiency of a signal value, by finding a pixel of the highest correlation even in an edge part and carrying out coding through random scan.

It is another object of the present invention to provide a decoding device and method which enables easy decoding of an image that is coded and transmitted in a random scan order in accordance with the characteristics of the image.

A coding device according to the present invention includes: an evaluation section for deciding, on the basis of the characteristics of an image signal having a plurality of pixel data, the coding order for the plurality of pixel data; and a coding section for coding the plurality of pixel data in the order decided by the evaluation section.

A decoding device according to the present invention is adapted for decoding, from a plurality of coded pixel data generated by coding an image signal made up of a plurality of pixel data having a predetermined order in an order based on the characteristics thereof, the plurality of pixel data having the predetermined order. The decoding device includes: a position data extraction section for extracting position data included in each of the plurality of coded pixel data; a level data extraction section for extracting level data included in each of the plurality of coded pixel data; and a conversion section for converting the level data of the plurality of coded pixel data to the predetermined order on the basis of the position data.

A coding method according to the present invention includes: a step of deciding, on the basis of the characteristics of an image signal having a plurality of pixel data, the coding order for the plurality of pixel data; and a step of coding the plurality of pixel data in the order decided at the step of deciding.

A decoding method according to the present invention includes: a step of extracting, on the basis of an image signal having a plurality of pixel data, the coding order for the plurality of pixel data; and a step of decoding the plurality of pixel data in the order extracted at the step of extracting.

BRIEF DESCRIPTION OF THE DRAWINGS

FIG. 2A is a signal distribution view showing biased distribution of a typical image signal in a color space of an RGB calorimetric system.

FIG. 2B is an information distribution view in an address space.

FIG. 3A is a view for explaining the concept of conventional scan.

FIG. 3B is a view for explaining the concept of scan according to the present invention.

FIG. 12 is a view showing four pixels of a 2×2-pixel block used for explaining decimation processing carried out by the encoder shown in FIG. 11.

FIGS. 13A, 13B, 13C and 13D are views showing four patterns of decimation performed on the four pixels shown in FIG. 12.

BEST MODE FOR CARRYING OUT THE INVENTION

Figure 1:
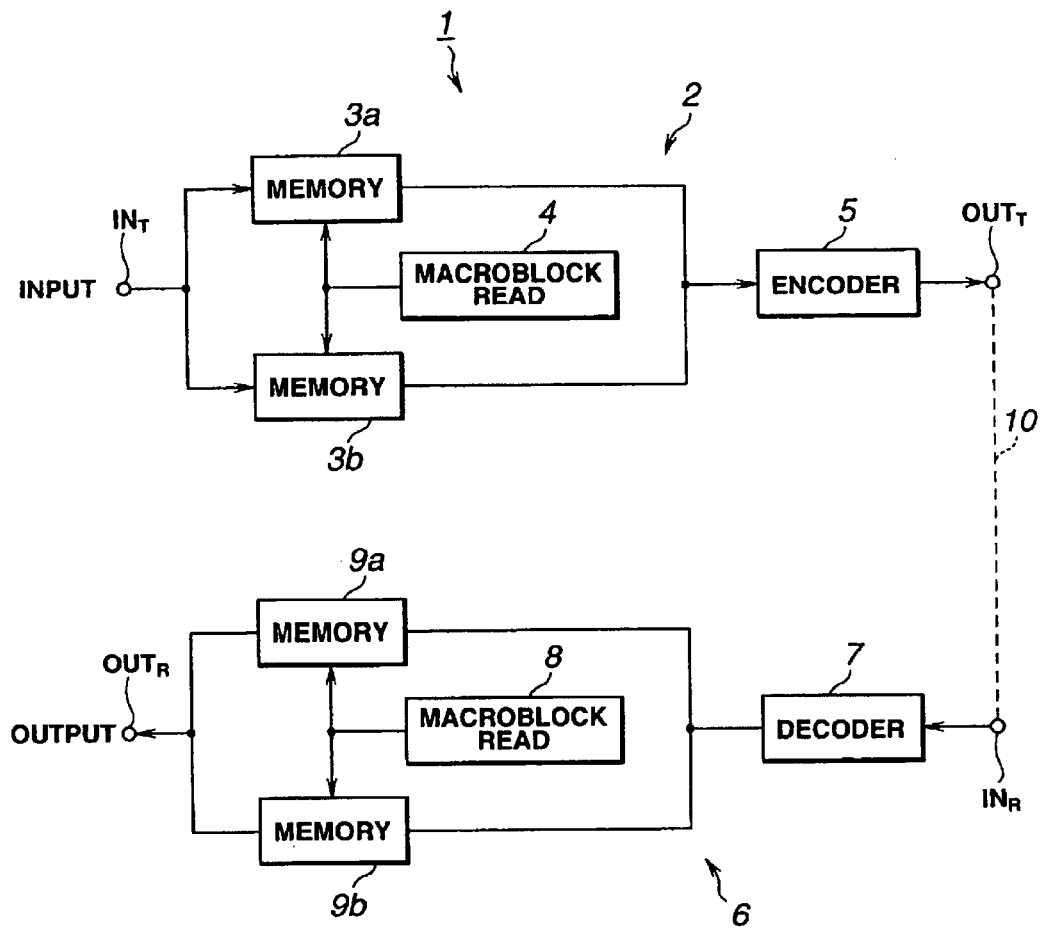
FIG. 1 is a block diagram showing the structure of an image processing system, which is an embodiment of the present invention.

A preferred embodiment of the present invention will now be described with reference to the drawings. In this embodiment, an image processing system 1 as shown in FIG. 1 is employed. The image processing system 1 includes a coding device 2 for coding digitized pixel information and outputting coded data, a transmission medium 10 for transmitting the coded data outputted from the coding device 2, and a decoding device 6 for receiving the coded data transmitted by the transmission medium 10 and decoding the received data.

With respect to a part where raster scan is disadvantageous to image correlation such as an edge part of an image of a typical television signal, the coding device 2 searches for another candidate having stronger image correlation so as to carry out coding, rather than coding pixel information in the disadvantageous direction. In short, instead of employing a regular coding order, pixel information as a coding target is sequentially decided in a random direction, which is different from a raster scan direction decided on the basis of the correlation of pixel information, in accordance with the characteristics and signal distribution of the image.

In a typical color image signal, the signal level distribution of the image is biased to a certain extent as shown in FIG. 2A, for example, in a color space of an RGB colorimetric system. On the other hand, when expressed in an address space, the image signal is uniformly distributed in a space such as a macroblock as shown in FIG. 2B. Thus, the coding device 2 splits an image signal having a plurality of pieces of pixel information into a plurality of macroblocks, and coded and transmits level information of each pixel information in the macroblocks and position information in accordance with the characteristics and signal distribution of the image signal.

The concept of the scan system according to the coding method of the present invention, employed by the coding device 2, will now be described with reference to FIG. 3. In the case of block coding with respect to a block of a given size, pixel information in the block is usually coded in a raster scan order as shown in FIG. 3A. On the contrary, in the coding method of the present invention employed by the coding device 2, an optimum macroblock area is set so as to search for the next pixel information to be coded, and the pixel information is coded in the optimum order within the macroblock. Therefore, as shown in FIG. 3B, the pixel information in each macroblock is coded and transmitted in a random order. The optimum order for coding the pixel information may be decided in an entire frame or in an entire field.

In the coding device 2 of FIG. 1, digital pixel information inputted from an input terminal $IN_T$ in a raster scan order is stored in memories 3a and 3b. These memories 3a and 3b have a bank switching structure in which pixel information of each macroblock is read out from one memory while pixel information of each macroblock is written into the other memory. Therefore, a macroblock read section 4 can read out pixel information of each macroblock from the memories 3a and 3b at different timing.

The pixel information read out for each macroblock by the macroblock read section 4 is supplied to an encoder 5. The encoder 5 optimizes the transmission order for the pixel information in the macroblock and removes the redundancy, thus outputting coded pixel data. The coded pixel data from the encoder 5 is outputted to the transmission medium 10 via an output terminal $OUT_T$.

The coding by the encoder 5 will now be described.

Figure 4:
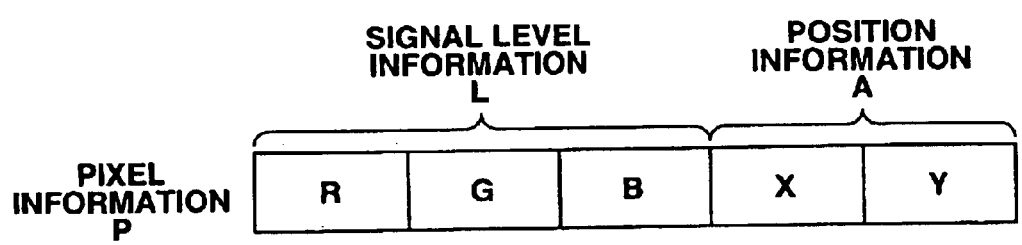
FIG. 4 is a view showing the format of pixel information.

First, an example of the format of pixel information is shown in FIG. 4. As pixel information P, signal level information L of the pixel and position information A of the pixel are used. As the signal level information L of the pixel, R, G and B primary colors are considered in this case, though a luminance signal Y, a blue color-difference signal Cb and a red color-difference signal Cr may be considered. As the position information A of the pixel, address positions X and Y of a target pixel on the two-dimensional coordinate are considered.

The encoder 5 splits each pixel information P in the macroblock into five components R, G, B, X and Y as shown in FIG. 4, and codes and transmits the components. The encoder 5 finds the difference between pixel information Ps (Rs, Gs, Bs, Xs, Ys) and pixel candidate Pn (Rn, Gn, Bn, Xn, Yn) to be coded and transmitted next, and finds the sum E of absolute values of the difference as expressed by an equation (1). Using the sum E of absolute values as an evaluation value, the encoder 5 decides the next pixel information Pn to be coded and transmitted so that the minimum evaluation value is obtained.

$$E=|Rn-Rs|+|Gn-Gs|+|Bn-Bs|+|Xn-Xs|+|Yn-Ys| \quad (1)$$

After deciding the transmission order using the evaluation function of the equation (1), the encoder 5 differentially codes the next pixel information Pn to be transmitted, and outputs the coded pixel data to the transmission medium 10. The encoder 5 will be later described in detail.

As the transmission medium 10, a disc-like or tape-like recording medium may be used as well as a communication channel such as a network.

The coded pixel data transmitted through the transmission medium 10 is inputted to the decoding device 6 via an input terminal $IN_R$. A decoder 7 decodes the address information X and Y, and stores decoded values of the signal level information at positions based on the address information X and Y in memories 9a and 9b having a band switching structure. Then, a macroblock read section 8 reads out the signal level information in the macroblock in the raster order from the memories 9a and 9b, and outputs the signal level information from an output terminal $OUT_R$.

The structure and operation of the encoder 5 and the decoder 7 will now be described in detail.

Figure 5:
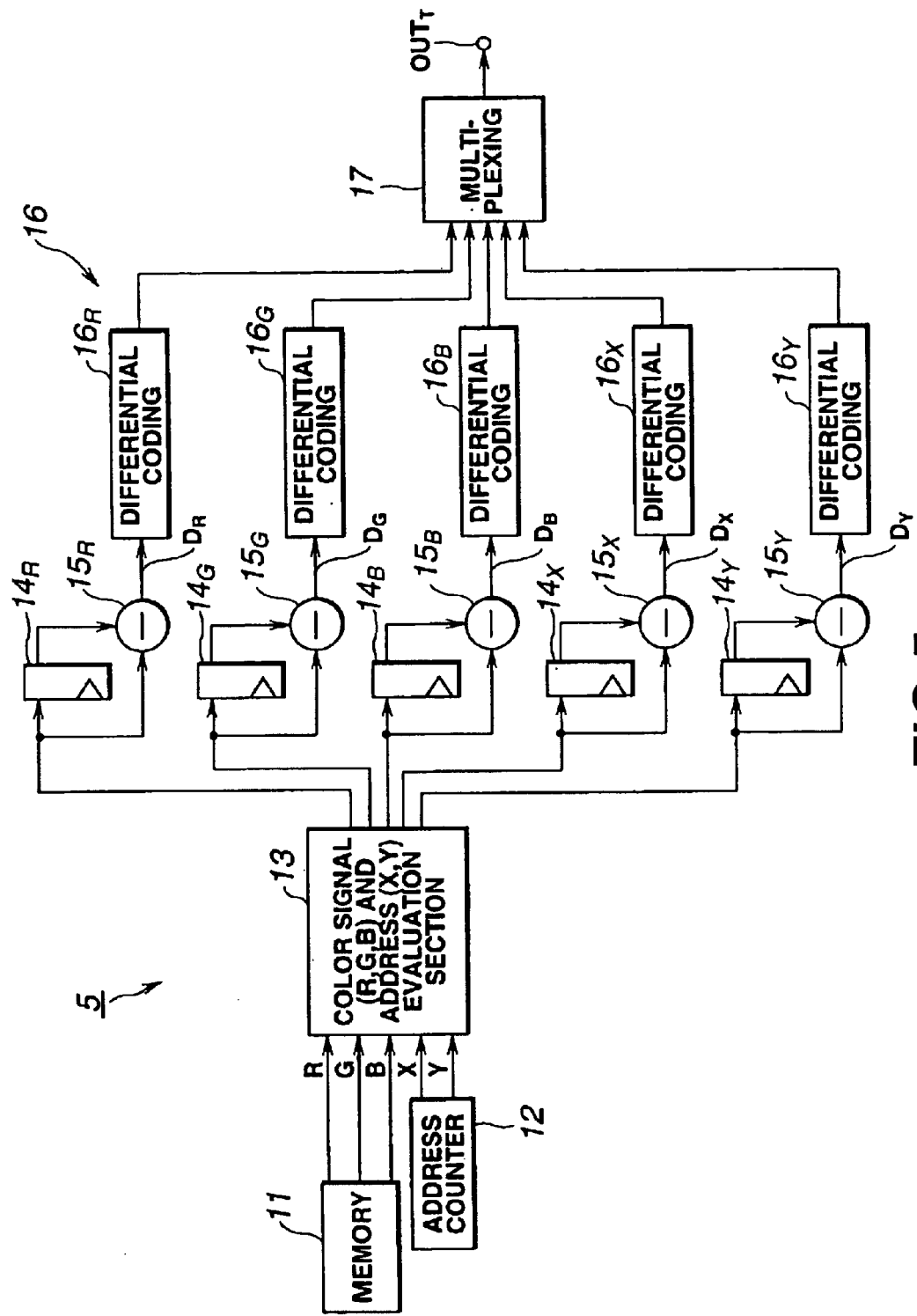
FIG. 5 is a block diagram showing the detailed structure of an encoder in a coding device of the image processing system.

The details of the structure of the encoder 5 are shown in FIG. 5. This encoder 5 includes an evaluation section 13 for evaluating the characteristics (strength of correlation between pixels) of an image signal using the evaluation value E of the equation (1) and for deciding the order for coding a plurality of pieces of pixel information in the macroblock in accordance with the characteristics, a differential coding section 16 for differentially coding the plurality of pieces of pixel information in the macroblock in the order decided by the evaluation section 13, and a multiplexing section 17 for multiplexing the differential coding output from the differential coding section 16.

The encoder 5 also has a memory 11 so as to store into the memory 11 the signal level information of the pixel information read out from the memories 3a and 3b for each of the components R, G and B. The encoder 5 also has an address counter 12 so as to count the address information X and Y of the signal level information by the address counter 12.

Figure 6:
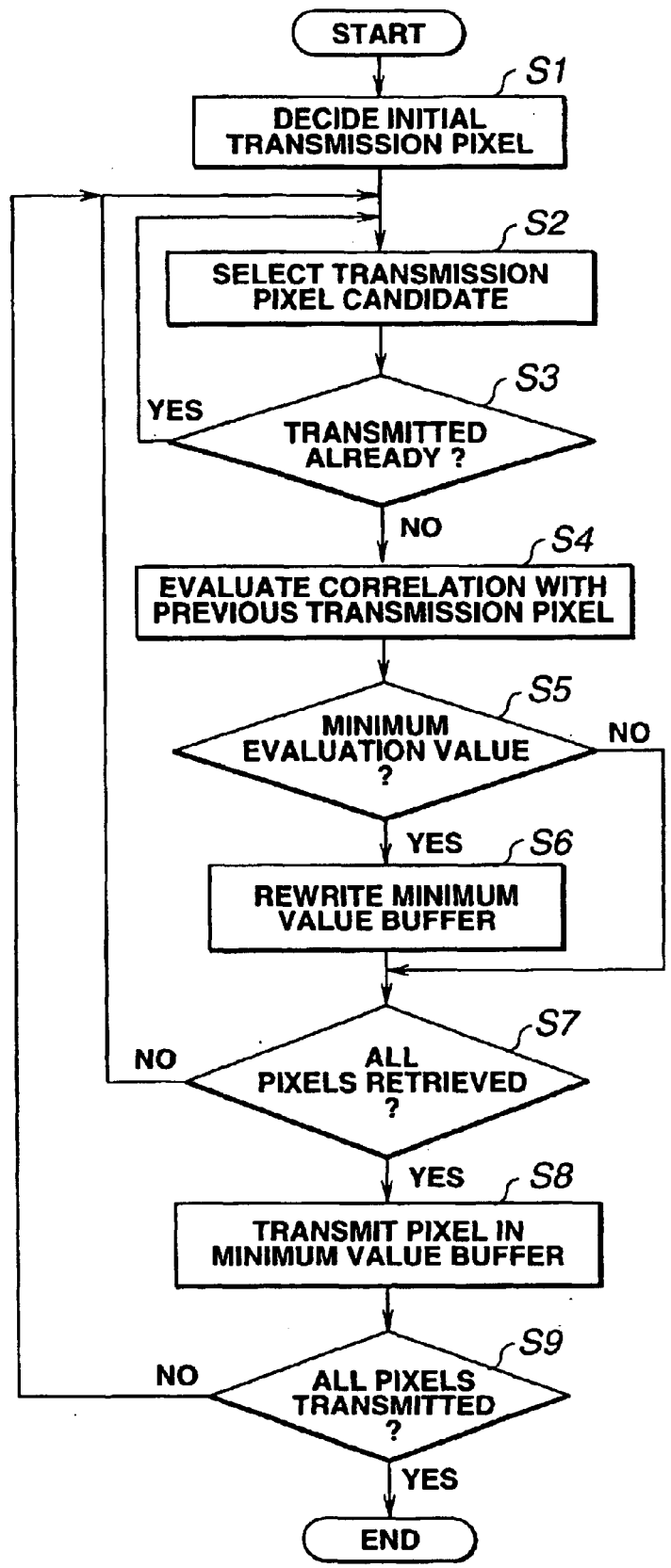
FIG. 6 is a flowchart for explaining optimization processing of the pixel transmission order carried out by the encoder shown in FIG. 5.

In the encoder 5, the signal level information from the memory 11 and the address information from the address counter 12 are read out, and the processing for optimizing the transmission order for the pixel information, that is, the processing for deciding the next pixel information to be transmitted, is carried out in accordance with the procedures shown in FIG. 6.

First, at step S1, the encoder 5 decodes initial transmission pixel information Ps. Although an arbitrary value is used in this case, the value may be decided by an optimum method based on a predetermined algorithm.

Next, at step S2, the encoder 5 selects a pixel information candidate Pn that should be transmitted next to the initial transmission pixel information Ps. The processing for selecting the transmission pixel information candidate Pn is carried out with respect to pixel information which is determined as not being transmitted yet at step S3, and is not carried out with respect to pixel information which is determined as being already transmitted.

Then, at step S4, the encoder 5 uses the evaluation section 13 to evaluate the correlation with respect to the pixel information candidate Ps using the evaluation function of the equation (1). The equation (1) is adapted to find the difference between the pixel information Ps (Rs, Gs, Bs, Xs, Ys) to be transmitted and the pixel information candidate Pn (Rn, Gn, Bn, Xn, Yn) to be transmitted next in the macroblock, and uses the sum of absolute value of the difference as the evaluation value E.

Subsequently, at step S5, the encoder 5 determines whether the evaluation value E of the evaluation function of the equation (1) is the minimum or not. If the evaluation value E is the minimum value, the processing goes to step S6 and the value of pixel information in a minimum value buffer, later described, provided inside the evaluation section 13 is rewritten. If the evaluation value E is not the minimum value, rewrite is not carried out. The encoder 5 repeats the minimum value search processing up to this step with respect to all the pixel information in the macroblock (step S7).

On completion of the search processing with respect to all the pixel information in the macroblock at step S7, the encoder 5 transmits the pixel information in the minimum value buffer as the next pixel information to be transmitted (step S8).

By repeating the processing of steps S2 to S8 until all the pixels in the macroblock are transmitted (step S9), the encoder 5 decides the next pixel information to be transmitted. As a matter of course, the encoder 5 may decide, at this point, the next pixel information to be transmitted and may transmit it at any time.

Figure 7:
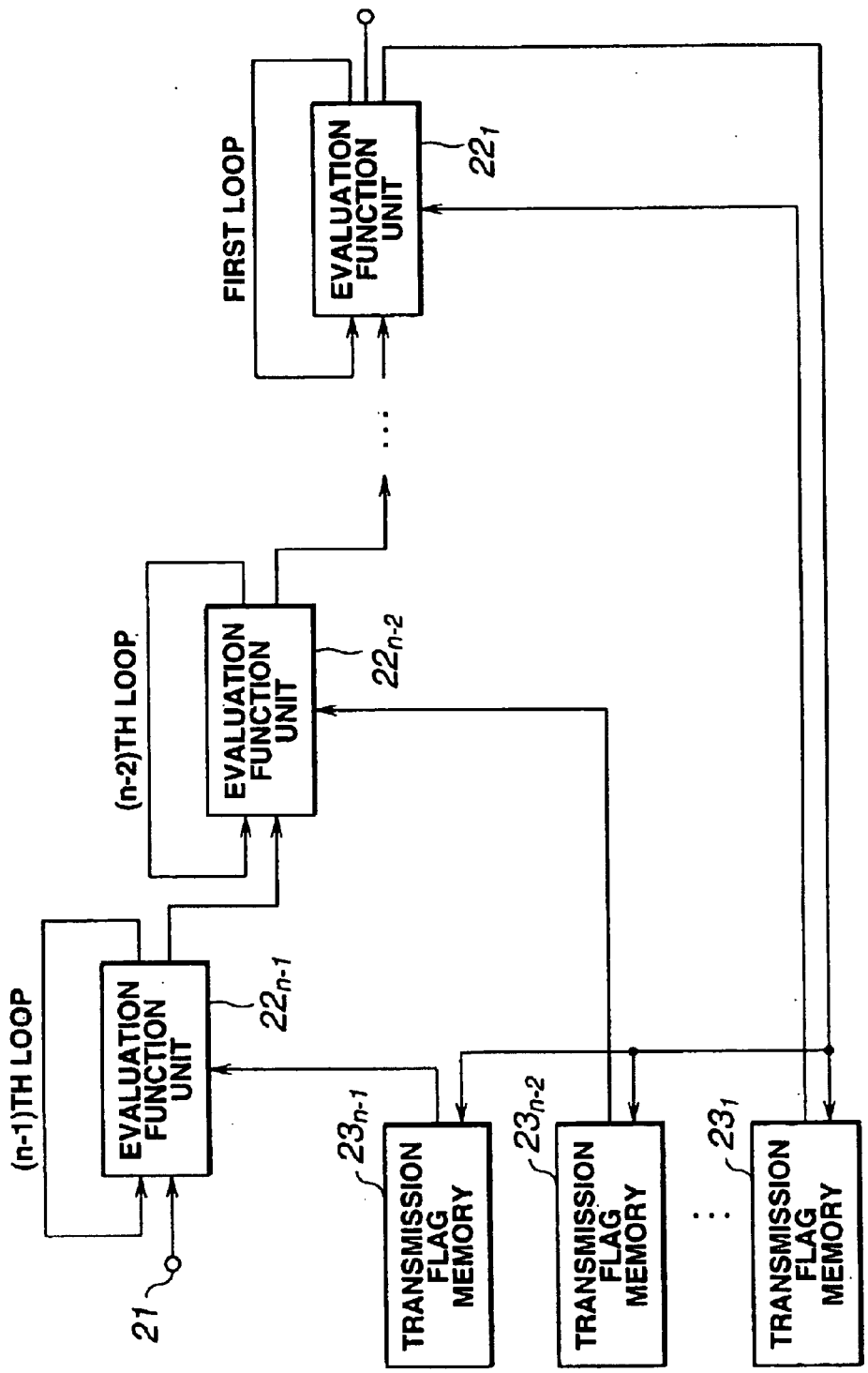
FIG. 7 is a block diagram showing the detailed structure of an evaluation section constituting the encoder.

The principle of the search processing with respect to all the pixels in the encoder 5 (corresponding to step S7) will now be described using an exemplary hardware structure as shown in FIG. 7.

It is assumed that the hardware structure has a plurality of evaluation function units for computing the evaluation function of the equation (1) from the level information R, G, B and the position information X, Y of the pixel information so as to find the evaluation value E.

When a clock rate for processing each pixel is used, with respect to n pieces of pixel information from an input terminal 21, an evaluation function unit $22_{n-1}$ repeats calculation of the evaluation value E in accordance with the evaluation function of the equation (1) for n−1 times, and decides pixel information which realizes the minimum evaluation value E, as the pixel to be transmitted next to the initial transmission pixel information.

An evaluation function unit $22_{n-2}$ repeats calculation of the evaluation value E in accordance with the evaluation function of the equation (1) for n−2 times, excluding the two pieces of pixel information for which the transmission order is already decided by the calculation at the evaluation function unit $22_{n-1}$, and thus decides the third pixel information to be transmitted.

Then, the calculation of the evaluation function of the equation (1) is repeated for n−3 times, n−4 times, . . . , once, until an evaluation function unit $22_1$ decides the last pixel to be transmitted in the macroblock.

The evaluation function units $22_{n-1}, 22_{n-2}, \ldots, 22_1$ are connected with transmission flag memories $23_{n-1}, 23_{n-2}, \ldots, 23_1$, respectively, in which a flag indicating "transmission completed" or "transmission not completed" is stored for every 8×8 pixels.

Figure 8:
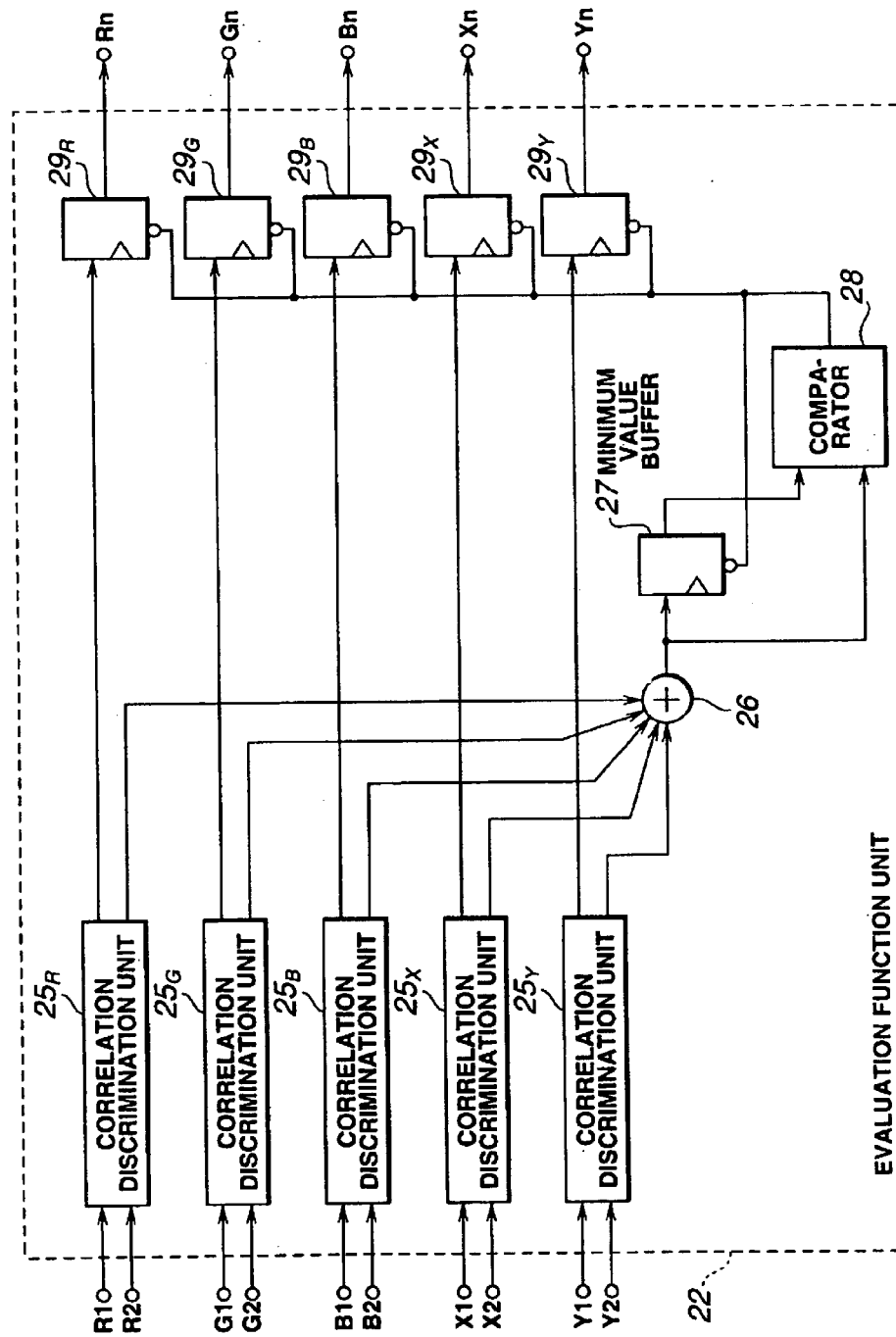
FIG. 8 is a block diagram showing the detailed structure of an evaluation function unit constituting the evaluation section.
Figure 9:
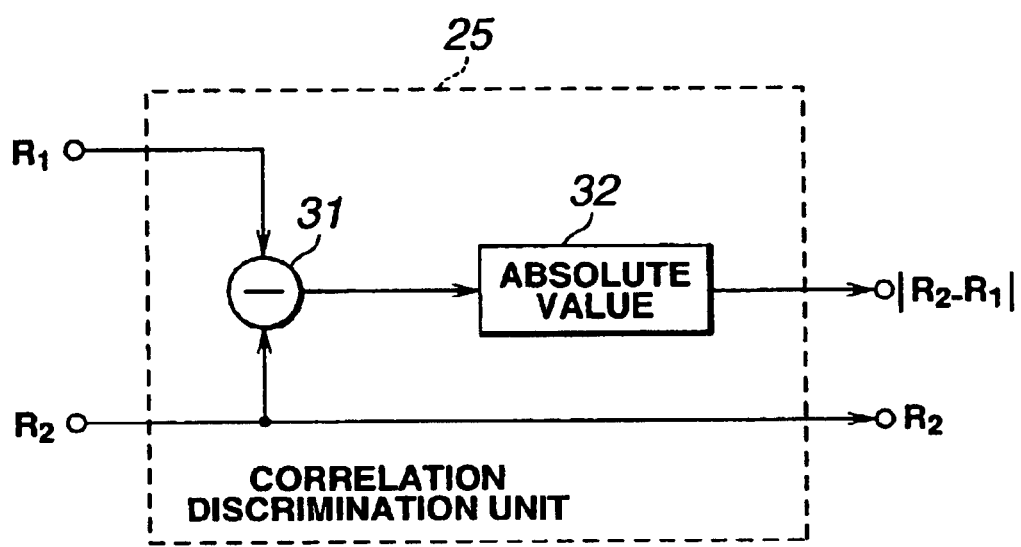
FIG. 9 is a block diagram showing the detailed structure of a correlation discrimination unit constituting the evaluation function unit.

The detailed structure of the evaluation function units $22_{n-1}, 22_{n-2}, \ldots, 22_1$ is shown in FIG. 8. On the assumption that the components of the previously transmitted pixel information are referred to as former values (including the initial transmission pixel information) while the components of the next pixel information to be transmitted are referred to as latter values (candidate values of transmission pixel information), the correlations between the former values $R_1$, $G_1$, $B_1$, $X_1$, $Y_1$, and the latter values $R_2$, $G_2$, $B_2$, $X_2$, $Y_2$ are discriminated by correlation discrimination units $25_R$, $25_G$, $25_B$, $25_X$ and $25_Y$, respectively. In the correlation discrimination unit 25, for example, with respect to R as shown in FIG. 9, the difference $R_2-R_1$, between the former value $R_1$ and the latter value $R_2$ is found by a difference section 31, and the absolute value of the difference $|R_2-R_1|$ is found by an absolute value section 32. Then, the absolute value of the difference $|R_2-R_1|$ and the latter value $R_2$ are outputted.

The absolute values of the differences of the respective components from the correlation discrimination units $25_R$, $25_G$, $25_B$, $25_X$ and $25_Y$ are supplied to an adder 26. The latter values of the respective components are supplied to latches $29_R$, $29_G$, $29_B$, $29_X$ and $29_Y$.

The addition result obtained by the adder is equal to the evaluation value E as follows.

$$|R_2-R_1|+|G_2-G_1|+|B_2-B_1|+|X_2-X_1|+|Y_2-Y_1|$$

The addition result is sent to a comparator 28. The comparator 28 compares an evaluation value from a minimum value buffer 27 which stores the minimum evaluation value up to this point, with the current evaluation value obtained as the result of addition. If the current evaluation value (addition result from the adder 26) is smaller than the evaluation value stored in the minimum value buffer 27, a reset output is sent to the minimum value buffer 27 and the latches $29_R$, $29_C$, $29_B$, $29_X$ and $29_Y$ so as to reset the values of the buffer and latches. Therefore, in the latches $29_R$, $29_G$, $29_B$, $29_X$ and $29_Y$, the pixel information candidate used for calculating a new evaluation value, that is, the latter values $R_2$, $G_2$, $B_2$, $X_2$, $Y_2$ are stored, respectively. After the search processing with respect to all the pixel information in the macroblock is completed, the last pixel information Pn (Rn, Gn, Bn, Xn, Yn) stored in the latches $29_R$, $29_G$, $29_B$, $29_X$ and $29_Y$ is transmitted.

The pixel information Pn (Rn, Gn, Bn, Xn, Yn) thus transmitted from the evaluation section 13 is supplied to subtracters $15_R$, $15_G$, $15_B$, $15_X$, $15_Y$. The subtracters $15_R$, $15_G$, $15_B$, $15_X$, $15_Y$ calculate difference values $D_R$, $D_G$, $D_B$, $D_X$, $D_Y$ between the already transmitted pixel information Ps (Rs, Gs, Bs, Xs, Ys) and the next pixel information to be transmitted Pn (Rn, Gn, Bn, Xn, Yn) stored in latches $14_R$, $14_G$, $14_B$, $14_X$, $14_Y$, and send the difference values to differential coders $16_R$, $16_G$, $16_B$, $16_X$, $16_Y$ of the differential coding section 16, respectively. The differential coders $16_R$, $16_G$, $16_B$, $16_X$, $16_Y$ differentially code the difference values $D_R$, $D_G$, $D_B$, $D_X$, $D_Y$, respectively. As a differential coding method, there is employed DPCM for re-quantizing the difference value, or a coding method using Huffman coding with optimization of the frequency of the difference value.

The coded values of the differences of the respective components from the difference coding section 16 are multiplexed by the multiplexing section 17 and transmitted to the decoding device 6 through the transmission medium 10.

Figure 10:
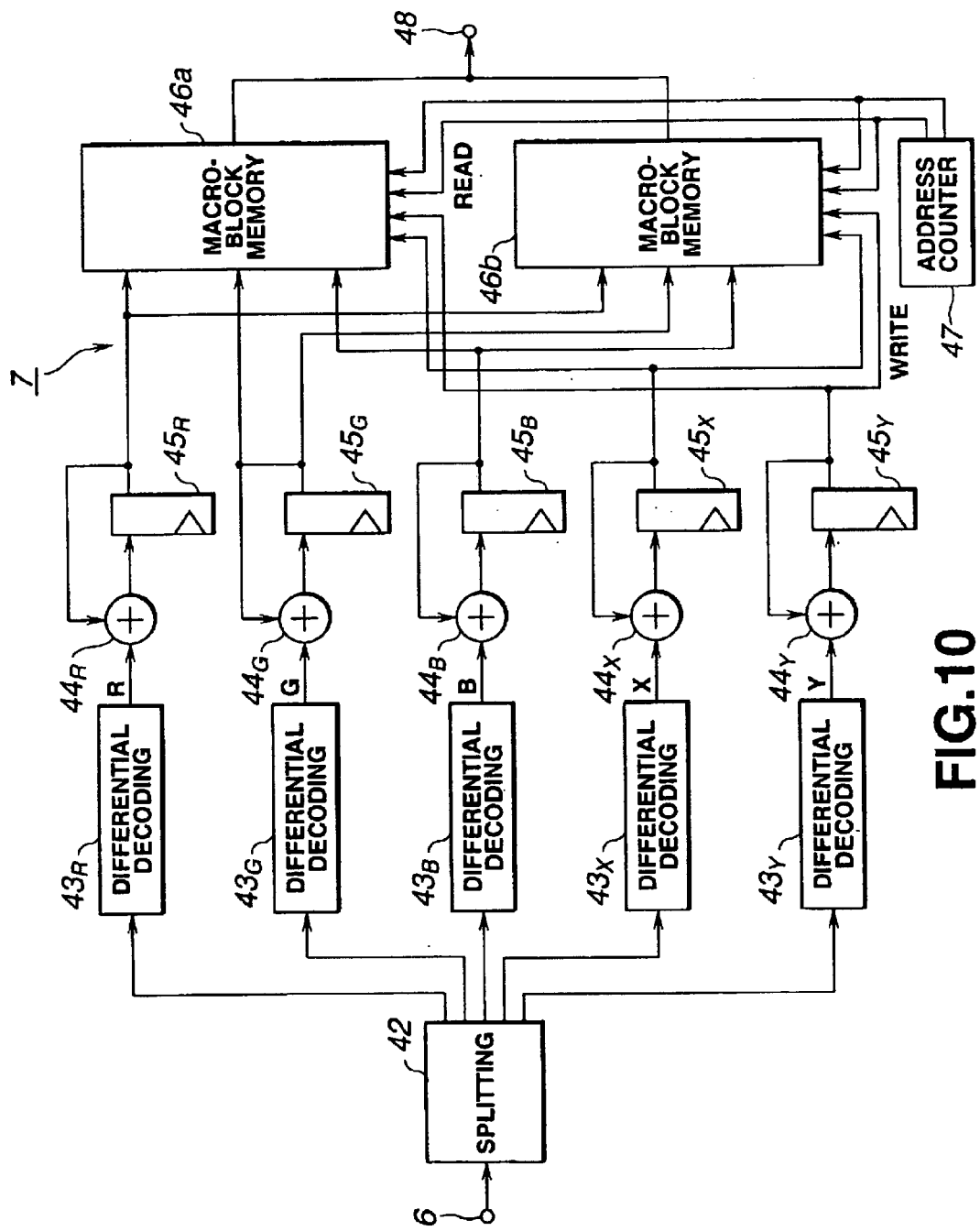
FIG. 10 is a block diagram showing the structure of a decoder in a receiving device of the image processing system.

The decoder 7 shown in FIG. 1 will now be described in detail with reference to FIG. 10. This decoder 7 carries out the decoding method of the present invention. The decoding method is adapted for decoding an image which is coded and transmitted in a random scan order in accordance with the characteristics of the image. In this method, pixel information of the transmitted image is decoded, and the image signal is read out in a raster scan order on the basis of the decoded pixel information.

To carry out the decoding method, the decoder 7 includes a splitting section 42 for splitting the coded value of the difference of the pixel information multiplexed in the encoder 5 into coded values of differences of the respective components, a differential decoding section 43 for decoding the differences from the coded values of differences of the respective components split by the splitting section 42, adders 44 and latches 45 constituting a component decoding section for obtaining component values of the pixel information from the differential decoding output from the differential decoding section 43, and macroblock memories 46a and 46b in which the level information R, G, B of the pixel information is written on the basis of the address information X, Y obtained by the component decoding section and from which the pixel information is subsequently read out in an ordinary scan order. The address for reading at the macroblock memories 46a and 46b is counted by an address counter 47 as an address following the ordinary scan order.

The following is the flow of operation of the decoder 7. That is, the splitting section 42 splits the differential coding value of the multiplexed components randomly transmitted thereto from the input terminal 6, and supplies the split values to differential decoders $43_R$, $43_G$, $43_B$, $43_X$, $43_Y$ of the differential decoding section 43, respectively.

The difference values of the respective components decoded by the differential decoders $43_R$, $43_G$, $43_B$, $43_X$, $43_Y$ are supplied to the adders $44_R$, $44_G$, $44_B$, $44_X$, $44_Y$ constituting the component decoding section, and are added to latch addition outputs from the latches $45_R$, $45_G$, $45_B$, $45_X$, $45_Y$. The respective component decoding outputs from the component decoding section are supplied to the macroblock memories 46a and 46b having a bank structure. Since the address counter 47 reads out, by raster scan, the address information used for random scan as described above, an image signal that is written in a random scan order is converted to an image signal in a raster scan order and then outputted from the macroblock memories 46a and 46b.

Thus, in the above embodiment, since a pixel of high correlation is searched for so as to carry out coding by raster scan coding with respect to an edge part or the like where no correlation can be found, the coding efficiency of the signal value is significantly high. Although the quantity of information is increased as address information which is not necessary for raster scan is sent, the quantity of information of the signal value can be reduced to a greater extent and therefore the coding efficiency is improved as a whole.

Figure 11:
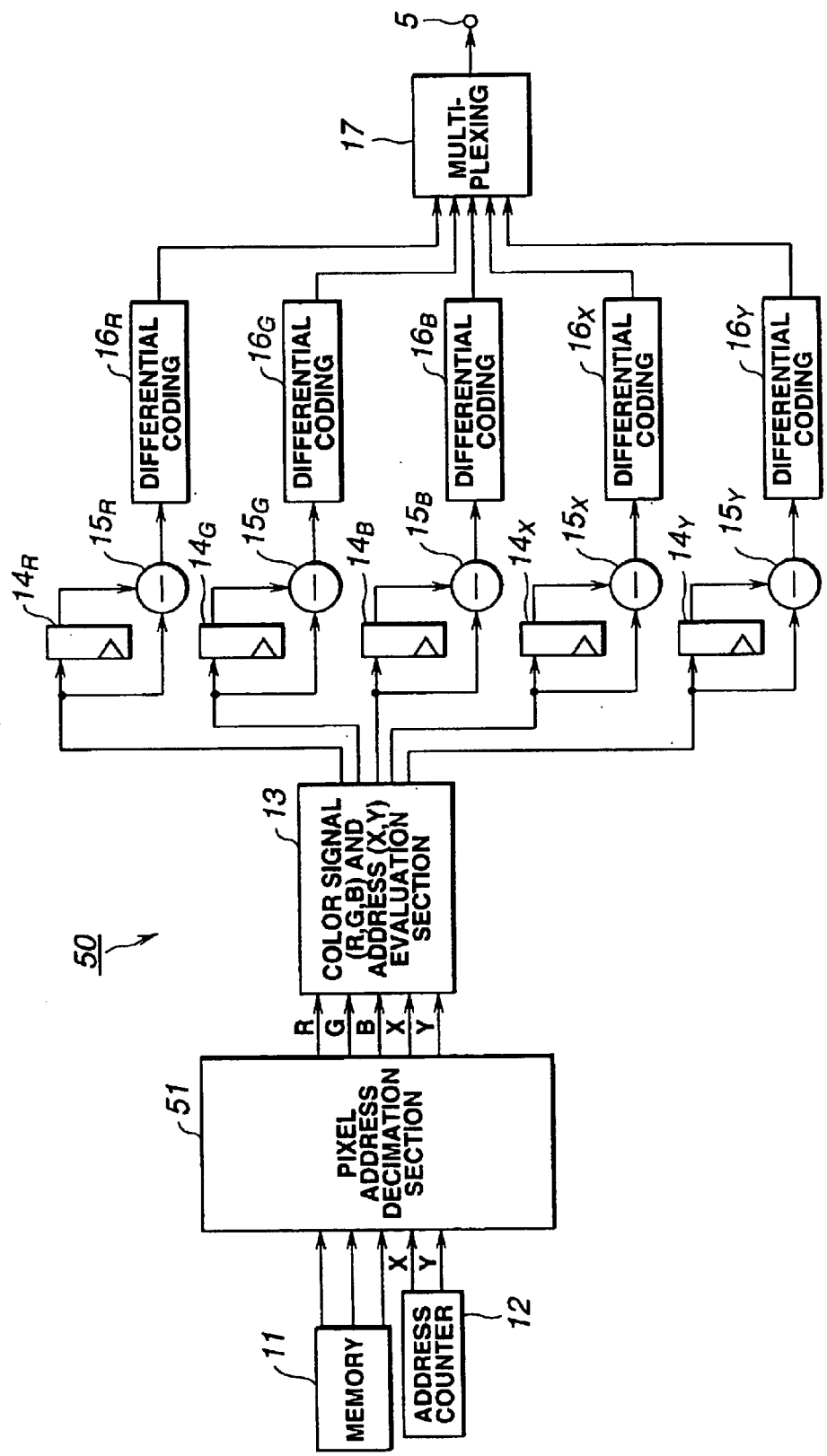
FIG. 11 is a block diagram showing another specific example of the encoder shown in FIG. 5.

In the coding device 2 of the image processing system shown in FIG. 1, an encoder 50 shown in FIG. 11 may be used in place of the encoder 5. The encoder 50 differs from the encoder 5 in that a decimation section 51 is provided on the stage before the evaluation section 13.

The decimation section 51 reduces the signal level information and address information of the pixel information. The principle of the decimation section 51 will now be described with reference to FIGS. 12 and 13A to 13D. The four pixels of a 2×2-pixel block shown in FIG. 12 are taken into consideration, and four patterns of pixel densities of FIG. 13A to 13D are adaptively employed with respect to the signal distribution of the four pixels. The four pixels have pixels values a, b, c, d, respectively.

It is now assumed that TH represents a threshold value. In the pattern 1 of FIG. 13A, the pixel values are replaced by (a+b+c+d)/4 when |a−b|<TH, |b−c|<TH, |c−d|<TH, |d−a|<TH, |a−c|<TH and |b−d|<TH are all satisfied. In the pattern 2 of FIG. 13B, the pixel values are replaced by (a+c)/2 and (b+d)/2 when only |a−b|<TH and |c−d|<TH are satisfied. In the pattern 3 of FIG. 13C, the pixel values are replaced by (a+b)/2 and (c+d)/2 when only |a−c|<TH and |b−d|<TH are satisfied. In the pattern 4 of FIG. 13D, the original pixel values are maintained when none of the above conditions is met.

By using the encoder 50 having this decimation section 51 for the coding device, the quantity of information is reduced.

Figure 14:
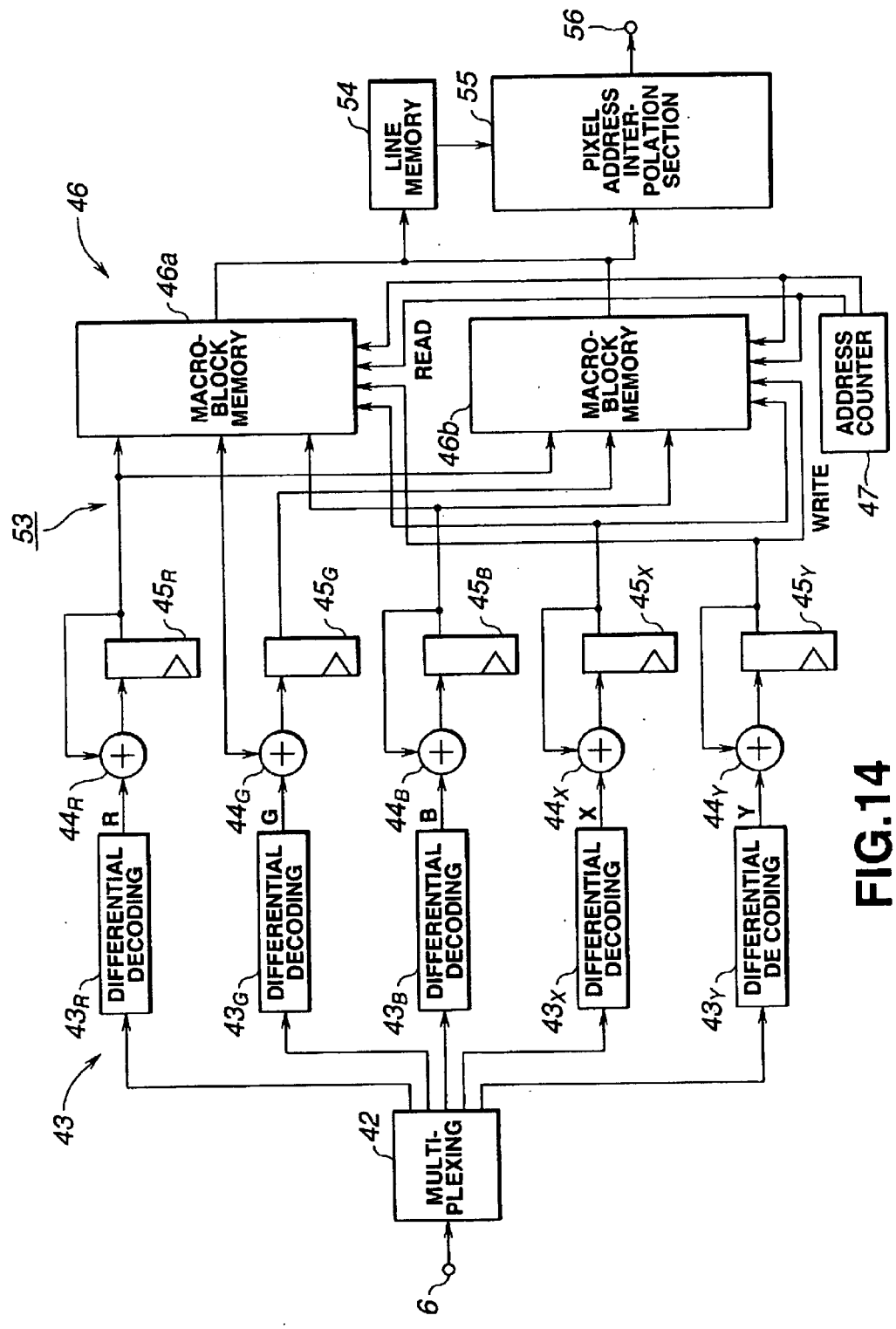
FIG. 14 is a block diagram showing another specific example of the decoder shown in FIG. 10.

FIG. 14 shows the structure of a decoder 53 which is necessary when the encoder 50 is used. On the image signal read out from the macroblock memories 46a and 46b, interpolation processing using a line memory 54 must be performed by a pixel address interpolation section 55. The interpolation output is outputted from an output terminal 56.

In the coding device 1, the random scan order may be optimized with respect to pixels for each macroblock in a frame image, or the random scan order may be optimized with respect to pixels for each macroblock in a field image. Moreover, a macroblock in the direction of time base may be used as a unit. The macroblocks need not be sent sequentially and the difference of the leading address of the macroblocks may be sent.

INDUSTRIAL APPLICABILITY

According to the present invention, since a pixel of high correlation is searched for so as to carry out coding even in an edge part, the quantity of information can be reduced and the coding efficiency of the signal value can be improved. Also, an image which is coded and transmitted in a random scan order in accordance with the characteristics of the image can be decoded with a simple structure.

What is claimed is:

1. A decoding device for decoding, from a plurality of coded pixel data generated by coding an image signal made up of a plurality of pixel data having a predetermined order in an order based on the characteristics thereof, the plurality of pixel data having the predetermined order, the device comprising:

a position data extraction section for extracting position data included in each of the plurality of coded pixel data;

a level data extraction section for extracting level data included in each of the plurality of coded pixel data; and a conversion section for converting the level data of the plurality of coded pixel data to the predetermined order on the basis of the position data.

2. The decoding device as claimed in claim 1, wherein the plurality of coded pixel data is coded in an order based on the characteristics for each predetermined range.

3. The decoding device as claimed in claim 2, wherein the predetermined range is the same frame or field.

4. The decoding device as claimed in claim 3, wherein the predetermined range is in the same macroblock in the same frame or field.

5. The decoding device as claimed in claim 1, wherein the coded pixel data is differentially coded in the predetermined order, the position data extraction section carries out differential decoding, thereby extracting the position data included in each of the plurality of coded pixel data, and the level data extraction section carries out differential decoding, thereby extracting the level data included in each of the plurality of coded pixel data.

6. The decoding device as claimed in claim 1, wherein the coded pixel data has the coding order decided therefor after a part of the plurality of pixel data having the predetermined order is decimated, the device further comprising an interpolation processing section for carrying out pixel interpolation processing with respect to the pixel data converted to the predetermined order by the conversion section.

7. A decoding method for decoding, from a plurality of coded pixel data generated by coding an image signal made up of a plurality of pixel data having a predetermined order in an order based on the characteristics thereof, the plurality of pixel data having the predetermined order, the method comprising:

a step of extracting position data included in each of the plurality of coded pixel data;

a step of extracting level data included in each of the plurality of coded pixel data; and a step of converting the level data of the plurality of coded pixel data to the predetermined order on the basis of the position data.

8. The decoding method as claimed in claim 7, wherein the plurality of coded pixel data is coded in an order based on the characteristics for each predetermined range.

9. The decoding method as claimed in claim 8, wherein the predetermined range is the same frame or field.

10. The decoding method as claimed in claim 9, wherein the predetermined range is in the same macroblock in the same frame or field.

11. The decoding method as claimed in claim 7, wherein the coded pixel data is differentially coded in the predetermined order, and wherein at the step of extracting the position data, differential decoding is carried out, thereby extracting the position data included in each of the plurality of coded pixel data, and at the step of extracting the level data, differential decoding is carried out, thereby extracting the level data included in each of the plurality of coded pixel data.

12. The decoding method as claimed in claim 7, wherein the coded pixel data has the coding order decided therefor after a part of the plurality of pixel data having the predetermined order is decimated, the method further comprising a step of carrying out pixel interpolation processing with respect to the pixel data converted to the predetermined order at the conversion step.

* * * * *